United States Patent
White et al.

(10) Patent No.: US 7,243,146 B2
(45) Date of Patent: Jul. 10, 2007

(54) METHODS AND APPARATUSES FOR USE IN ASSET TRACKING DURING FILE HANDLING

(75) Inventors: Craig R. White, Eagle, ID (US); Binnur Al-Kazily, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 09/999,514

(22) Filed: Oct. 24, 2001

(65) Prior Publication Data

US 2003/0079006 A1 Apr. 24, 2003

(51) Int. Cl.
*G06F 15/173* (2006.01)

(52) U.S. Cl. .................... 709/224; 709/202; 709/228; 717/100; 717/103

(58) Field of Classification Search ............... 709/203, 709/217, 223–229, 202; 717/100, 103
See application file for complete search history.

(56) References Cited

U.S. PATENT DOCUMENTS

| | | | | |
|---|---|---|---|---|
| 5,745,901 A * | 4/1998 | Entner et al. | ........... | 707/103 R |
| 5,774,661 A * | 6/1998 | Chatterjee et al. | ........... | 709/238 |
| 5,826,020 A * | 10/1998 | Randell | ........... | 709/202 |
| 5,918,226 A * | 6/1999 | Tarumi et al. | ........... | 707/102 |
| 5,960,404 A * | 9/1999 | Chaar et al. | ........... | 709/202 |
| 5,978,836 A * | 11/1999 | Ouchi | ........... | 709/219 |
| 6,073,109 A * | 6/2000 | Flores et al. | ........... | 709/219 |
| 6,728,947 B1 * | 4/2004 | Bengston | ........... | 709/203 |
| 2003/0120593 A1 * | 6/2003 | Bansal et al. | ........... | 705/39 |

* cited by examiner

*Primary Examiner*—Phuoc Nguyen

(57) ABSTRACT

Methods and apparatuses are provided for recording asset tracking parameters in networked devices. One method includes providing a workflow that includes at least one processing mechanism, associating at least one parameter with the processing mechanism, processing at least a portion of a data file according to the workflow using the processing mechanism, and recording information regarding the parameter. Information regarding the parameter(s) may be recorded within a resulting processed data file that is saved. Thus, the processed data file may include a metadata portion that includes the information regarding the parameter(s). The method also includes selectively retrieving the information regarding the recorded parameter(s) from the resulting processed data file. In other implementations, the method may include providing information regarding the parameter(s) to a database and thereafter selectively retrieving such information from the database.

17 Claims, 4 Drawing Sheets

METHODS AND APPARATUSES FOR USE IN ASSET TRACKING DURING FILE HANDLING

TECHNICAL FIELD

The present invention relates generally to networked devices, and more particularly to automated asset tracking methods and apparatuses for use therein.

BACKGROUND

There is continued effort to connect computers and other devices together to meet the needs of a variety of different users. Consequently, both wired and wireless networks are becoming more and more common in businesses, organizations, and homes. These networks allow for data to be transferred between the various devices and also processes/processing to be selectively distributed and/or centralized, as needed. Moreover, such networks allow for certain networked devices or resources to be shared by a plurality of other devices. One common example of a shared resource is a printer. Here, for example, a laser printer may be configured to support several different users/computers. Another common example of a shared device is a server. A server may be configured for access by different users/computers. Many other types of devices may likewise be configured as a shared resource.

In certain situations, it is often necessary for the users, network administrators and/or other various others to understand how well the networked devices, including the shared resources, and the network are performing. To understand or otherwise analyze the performance of these devices/resources, performance monitoring applications/programs may be run on a networked computer or other like networked device to collect and record selected operational parameters and provide such information to an interested party. Many of these programs also provide analysis tools and/or perform automated analysis. In certain configurations, such programs may also be implemented so as to modify the operation of the network or networked devices, for example, in an effort to increase operational efficiency, address identified problems, etc.

These and similar programs are usually designed to collect and store the current status of selected networked devices. The status, for example, may indicate if the device is operating properly. The status may also include, for example, information about the number of tasks performed over a given period of time and/or a record identifying other devices that have accessed or otherwise communicated with the device providing its status. While such status reports may be useful for a variety of purposes, there is typically a lack of detailed information regarding how individual data files have been processed.

It would be beneficial to understand how an individual data file has been processed, accessed, or otherwise used, by various networked devices, programs running thereon, and/or users associated therewith. Hence, there is a need for methods and apparatuses that can provide such information and other similar information. Preferably, the methods and apparatuses will not significantly degrade the performance of the various networked devices, or otherwise substantially alter the operation of the various networked devices.

SUMMARY

In accordance with certain aspects of the present invention, methods and arrangements are provided which monitor, or otherwise collect and record information about how an individual data file has been processed, accessed, or otherwise used, by various networked devices, programs running thereon, and/or users associated therewith. The methods and arrangements may be configured in such manner so as to not significantly degrade the performance of the various networked devices, or otherwise substantially alter the operation of the various networked devices.

By way of example, the above stated needs and others are satisfied by a method that includes providing a workflow that includes at least one processing mechanism, associating at least one parameter with the processing mechanism, processing at least a portion of a data file according to the workflow using the processing mechanism, and recording information regarding the parameter. For example, information regarding the parameter(s) may be recorded within a resulting processed data file that is saved. Thus, in this instance, the processed data file may include a metadata portion that includes the information regarding the parameter(s). The method may then further include selectively retrieving the information regarding the recorded parameter(s) from the resulting processed data file. In other exemplary implementations, the method may include providing information regarding the parameter(s) to a database and thereafter selectively retrieving such information from the database.

In certain implementations, for example, the processing mechanism may include an application program, a driver program, a communication program, a coding program, a decoding program, a data conversion program, a database program, an operating system program, or other like processing/process-supporting mechanism. With this in mind, the processing mechanism may include a computer, a server, a communication device, a peripheral device, a printing device, a scanning device, an imaging device, an entertainment device, and the like.

The parameter(s) may, for example, include a processing mechanism time parameter, a processing mechanism communication parameter, a processing mechanism identity parameter, a processing mechanism status parameter, a processing mechanism error parameter, a processing mechanism resource parameter, and/or other like parameters. In certain implementations, the data file may include identifying data, textual data, numerical data, image data, video data, audio data, and control data, for example.

In accordance with certain other aspects of the present invention, an apparatus is provided to meet the above stated needs and others. Here, the apparatus includes processing logic that is configured to process at least a portion of a data file and output a resulting processed data file, and agent logic operatively configured to include additional data in the resulting processed data file. The additional data is related to at least one processing parameter associated with the processing logic.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
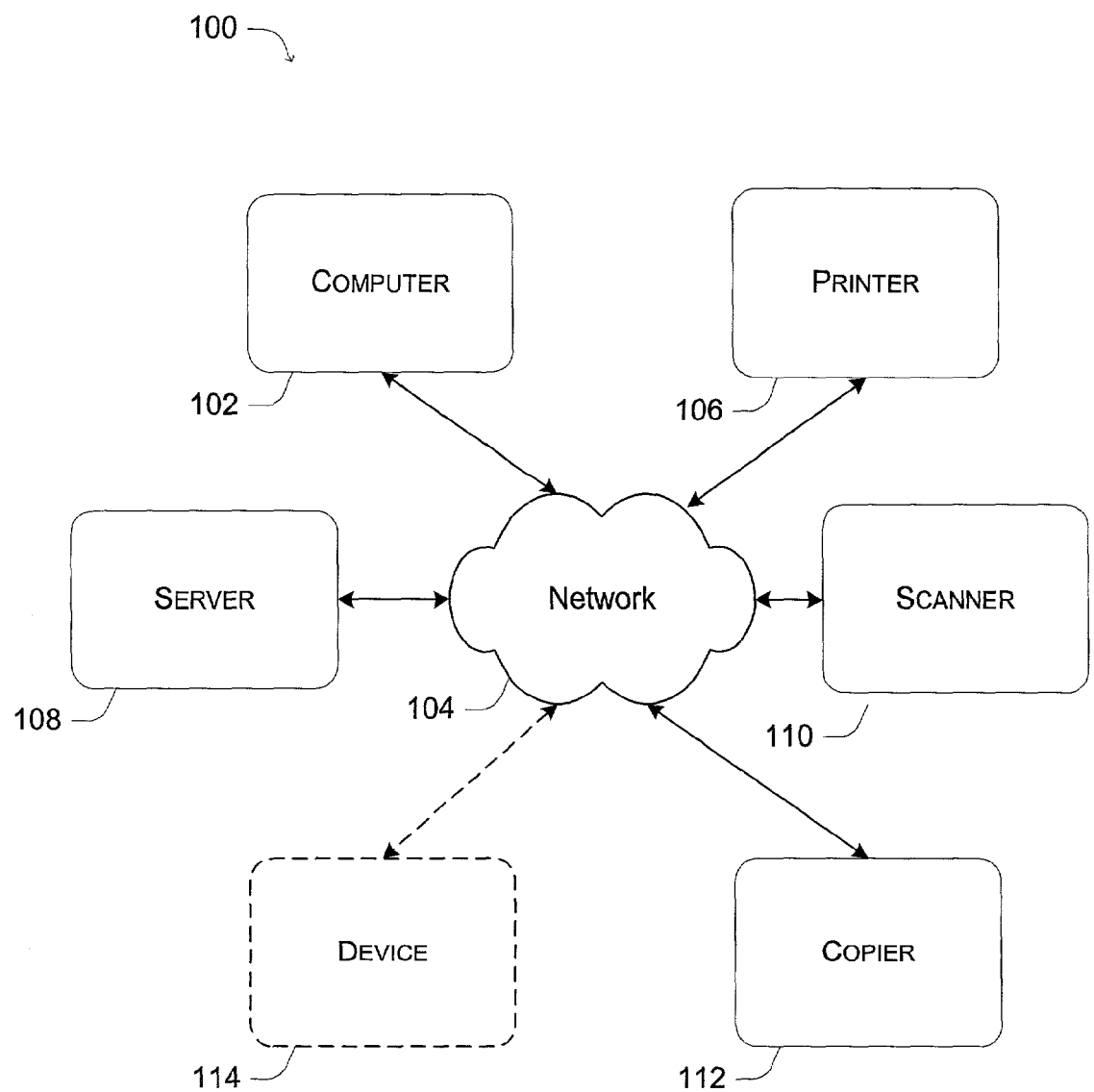
FIG. 1 is a block diagram depicting a networked environment, having a plurality of networked devices, in accordance with certain exemplary implementations of the present invention.

One common type of file processing workflow is one that supports the printing of a file from a desktop computer that is connected to a network along with a printing device (e.g., a printer, copier, etc.). Using an application, such as, for example, a word processor, spreadsheet, etc., a user can initiate a print job by selecting the appropriate print command. The file is then, in this example, provided by the application to one or more drivers on the desktop computer. The driver(s) processes the file accordingly, and the resulting file may then be provided over the network to one or more servers, for example. Within the server(s), additional drivers or other programs may further process the resulting file. The resulting processed file may then be transferred over the network to a printer or like device, which may further process the file to prepare the data for printing. In certain situations, finishing information such as, e.g., stapling, collating, etc., may also need to be identified in the resulting print job.

In this simple case, it is not easy to track which of these and other processing mechanisms actually processed the file. Moreover, in the past it has not been a trivial task to gather such information about these and other assets, which are utilized in processing the file. For example, it may be useful to know the amount of time that a given processing mechanism takes to process a file, if there were any delays in the processing, if there were any errors, what and how many physical resources were needed (e.g., the amount of paper, ink, staples, etc.). In the past, such tracking would require a significant amount of manual work.

While such forms of advanced asset tracking may not be appropriate for all systems, there are instances where certain assets may need to be tracked more than others. By way of example, in a printing environment, tracking the amount of ink, especially expensive ink, used during a specific printing job may prove useful for billing purposes. In other systems, for example, it may be beneficial to track the usage of an application by a specific computer/user as per a specific file. In still other systems, there may be a need to analyze the processing of a file according to a specified workflow to better control costs, improve efficiency, eliminate bottlenecks, or otherwise monitor/modify assets in the workflow.

To meet these needs and others, in accordance with certain exemplary aspects of the present invention, recording functionality is provided within selected processing mechanisms in the workflow. The recording functionality causes certain tracking information associated with the various processing mechanisms to be included in the resulting processed file (or to be otherwise recorded). In this manner, retrieval functionality can be provided to retrieve/examine the tracking information, at any point in the workflow or at any subsequent point in time (provided the resulting processed file has been saved).

In accordance with certain further aspects of the present invention, managing functionality may also be provided. The managing functionality can be arranged to install/update the recording functionality, for example. The managing functionality may also be configured to select at least one parameter applicable with an individual processing mechanism that is to be recorded by the associated recording functionality.

These exemplary functionalities advantageously provide an automated asset tracking mechanism that can be tailored to meet the specific needs of individual devices and/or all or part of the overall system. In addition to printing related workflows, the functionalities provided herein may be adapted for use with other file handling workflows.

In accordance with certain exemplary implementations of the present invention, the recording functionality can be provided by asset agent logic that is operatively associated with a specific processing mechanism. For an exemplary printing job, the asset agent logic may gather and include tracking information such as, e.g., the time that a print job arrived at the processing mechanism, the time that the processed job left or was otherwise completed by the processing mechanism, the size of the print job processed, the amount of disk space used for the print job, and other like information which may be useful in tracking the asset.

The asset agent logic can, for example, be operatively provided in the form of computer implementable instructions for certain processing mechanisms. Thus, in some managed systems, a management application, which provides the managing functionality, can be used to distribute, install, and/or update such asset agent software. The management application may also provide the retrieval functionality.

In addition to providing the asset agent logic to each selected processing mechanism, additional asset agent meta-data can be operatively provided to each selected processing mechanism. Here, the asset agent meta-data can be configured to identify one or more parameters associated with the asset agent logic that are to be monitored and recorded as described above by the asset agent logic.

A block diagram is provided in FIG. 1, which depicts a networked environment 100 having a plurality of networked devices, in accordance with certain implementations of the present invention.

As shown, networked environment 100 includes a computer 102 that is connected (i.e., operatively coupled) to a network 104. Computer 102 may be any type of computer that is capable of sharing information in the form of data with other devices over network 104. Thus, for example, computer 102 may include a conventional personal computer, workstation, etc. Network 104 is representative of any data communication link(s) capable of carrying information in the form of data between two or more connected devices. Thus, for example, network 104 may include conventional wired and wireless data communication links, networks, and the like. In certain configurations, network 104 represents the Internet, an intranet, etc.

Several other exemplary devices are also connected to network 104. Here, for example, a printer 106, a server 108, a scanner 110, and a copier 112 are each shown as being connected to network 104. Additionally, a representative device 114 is also shown as being connected to network 104. Device 114 can be any device that includes or otherwise provides a processing mechanism suitable for processing all or part of a data file that can be shared with at least one other device via network 104.

Of interest in the exemplary implementations as described herein, are the workflows that can be arranged to process a file in a certain manner in support of a file printing process. As used in these examples, the workflow establishes at least some of the processing mechanisms provided within one or more devices that are included in the file printing process.

Figure 2A:
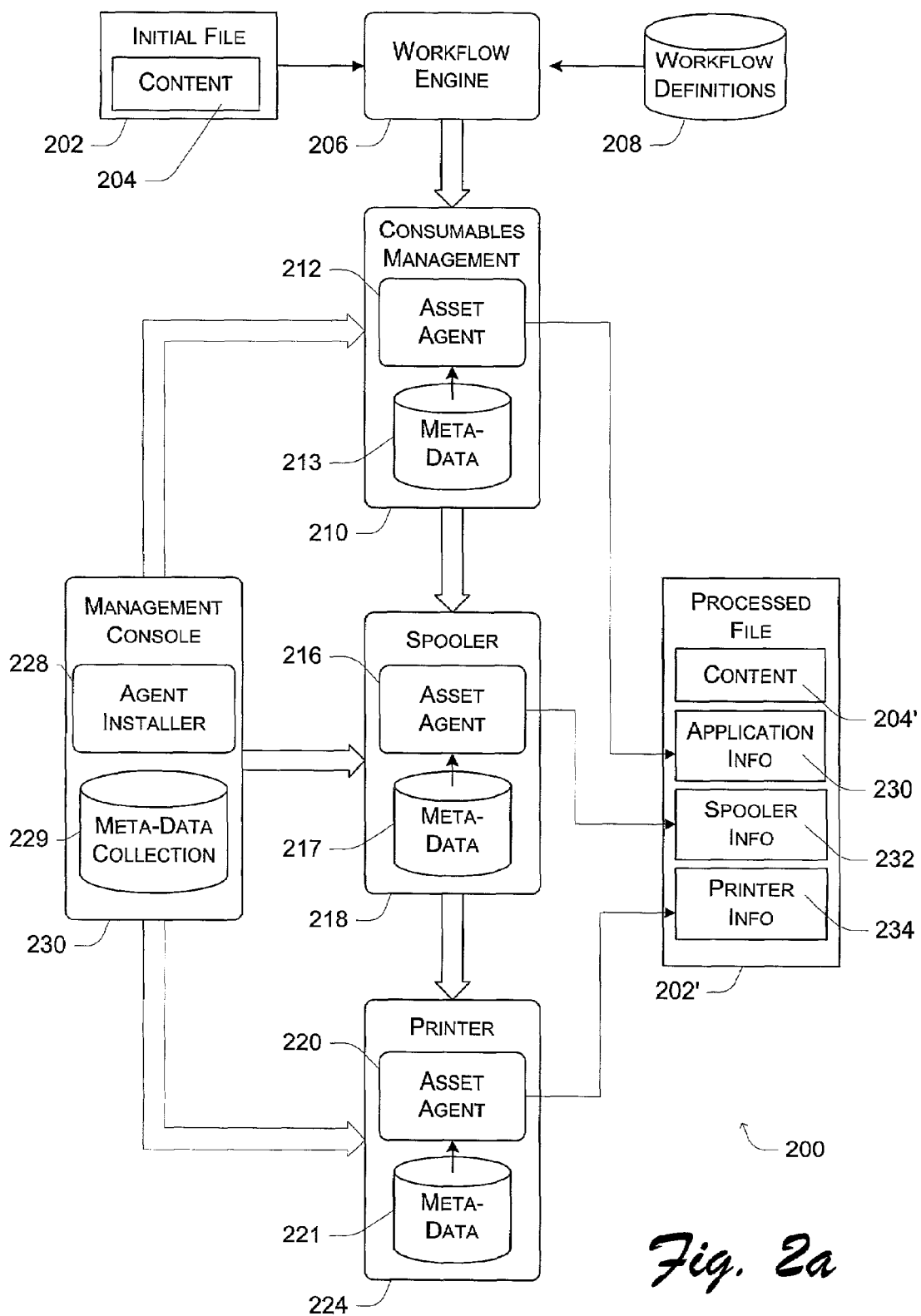
FIG. 2a is a block diagram depicting a workflow associated with a file that is being processed by various processing mechanisms, in accordance with certain exemplary implementations of the present invention.

With this in mind, FIG. 2*a* is a block diagram depicting an exemplary workflow 200 associated with an initial file 202 that is being processed by certain processing mechanisms in various networked devices, in accordance with certain implementations of the present invention.

Here, initial file 202 includes content 204. In this example, content 204 may include data representing any type of printable information. Initial file 202 is provided to a workflow engine 206. Workflow engine 206 is configured to establish an applicable workflow based on initial file 202, which may also include print selection information (not shown), and workflow definitions 208. Workflow definitions 208 provide previously defined workflow steps. Examples of the information provided by workflow definitions 208 may include an end of the month report, a presentation report, and the like. Each of these workflow definitions would define a different set of workflow steps and/or a different ordering of such steps. Workflow engines such as these are well known.

In the example presented in FIG. 2*a*, there are three workflow steps as depicted by certain processing mechanisms. A consumables management process mechanism 210 is included in a first workflow step. Next, a spooler processing mechanism 218 is included in a second workflow step, followed by a printer processing mechanism 224 that is included in a third workflow step. Here, each workflow step refers to at least one separate execution phase of the workflow itself. Those skilled in the art will recognize that other steps/orderings may be defined or provided for in similar fashion.

Also depicted in FIG. 2*a* is a management console 230. Management console 230 is configured to provide and/or otherwise manage the asset agents and associated meta-data that is operatively arranged within the exemplary processing mechanisms. Thus, as depicted, consumables management processing mechanism 210 includes an asset agent 212 and associated metadata 213, spooler processing mechanism 218 includes an asset agent 216 and associated meta-data 217, and printer processing mechanism 224 includes an asset agent 220 and associated meta-data 221. Asset agents 212, 216, and 220 are each configured to monitor at least one specific parameter associated with their respective processing mechanisms/workflow steps. The parameter(s) are defined in the meta-data associated with each asset agent. The asset agents may be installed or otherwise maintained/managed, for example, via an agent installer 228 within management console 230.

A meta-data collection 229 is also depicted as being included in management console 230 and operatively associated with agent installer 228. Meta-data collection 229 includes various meta-data that can be selectively provided in meta-data 213, 217, and/or 221 to define one or more parameters therein, for which tracking information is to be recorded and or otherwise included in the resulting processed file by the respective processing mechanism.

Exemplary consumables management tracking parameters include the amount of ink that is required to print all or part of the file, the amount/type of print media required, finishing materials required, an amount/cost for these and other consumables needed to print all or part of the file per a print job. These values may be estimates in some cases. Another tracking parameter may correlate the costs to a particular billing account, for example, based on an identified print job submitter or other like identifying information. Exemplary print spooler tracking parameters include the time that a print job arrived at the print spooler, the time that the processed job left the print spooler, the size of the print job processed, the amount of disk space used for the print job, etc. Exemplary printing device tracking parameters include processing timestamps (e.g., start, end, etc.), number of pages printed, type of media used, finishing steps, certain error information, and the like.

A resulting processed file 202' is shown in FIG. 2*a*. Resulting processed file 202' includes processed content 204' and application tracking information 230 as provided by asset agent 212, spooler tracking information 232 as provided by asset agent 216, and printer tracking information 234 as provided by asset agent 220.

Figure 2B:
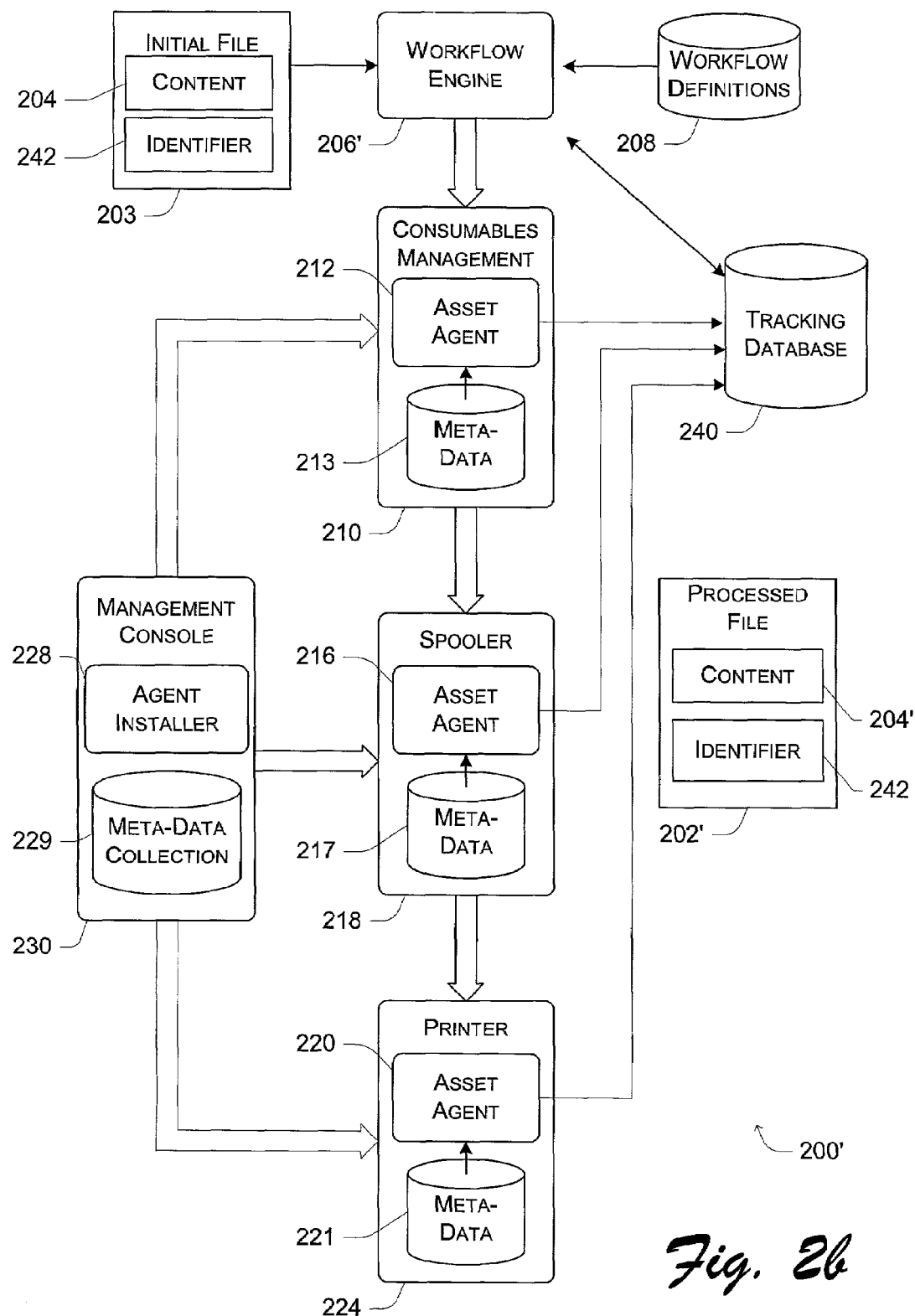
FIG. 2b is a block diagram depicting a workflow associated with a file that is being processed by various processing mechanisms, in accordance with certain further exemplary implementations of the present invention.

FIG. 2*b* is a block diagram of a workflow 200' depicting many of the same workflow steps, in accordance with certain other exemplary implementations of the present invention.

In this example, a resulting processed file 203' is subsequently correlated back to a tracking database 240 through an associated file identifier that is initially provided by tracking database 240 and included as additional information in the file. Here, for example, workflow engine 206' is configured to request a file identifier 242 from tracking database 240 and include information representing file identifier 242 in the initial file, as illustrated by file 203. Thereafter, the selected processing mechanisms 210, 218 and 224 each provide applicable tracking information to tracking database 240 along with file identifier 242. Tracking database 240 is preferably configured to allow for the operative storage and selective retrieval of the tracking information based at least on file identifier 242, for example. Those skilled in the art will recognize that tracking database 240 may also be configured to selectively retrieve recorded information based on other data, and/or for similar types of data associated with a plurality of processed files.

Figure 3:
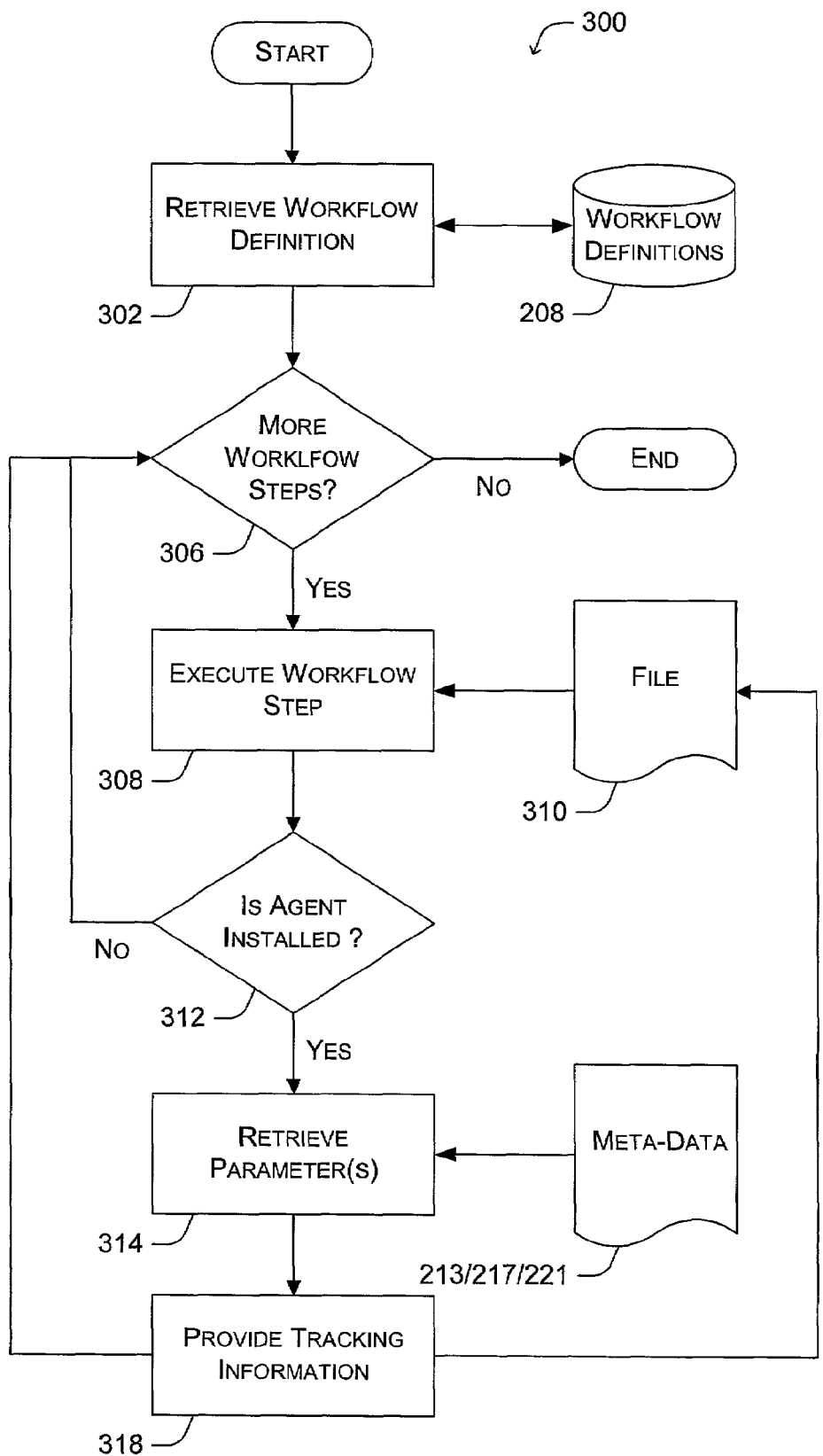
FIG. 3 is a flow chart depicting an information recording process associated with a workflow, e.g., as in FIGS. 2a-b, in accordance with certain exemplary implementations of the present invention.

With the exemplary workflows depicted in FIGS. 2*a-b* in mind, attention is now drawn to FIG. 3, which is a flow chart depicting an information recording process 300 associated with a workflow. Here, in step 302, a workflow definition is retrieved from workflow definitions 208. In step 306, a decision is made as to whether additional workflow steps remain. If the answer is YES, then process 300 continues to step 308. Conversely, if the answer in step 306 is NO, then process 300 is completed and ends.

In step 308, the next workflow step is executed using file 310. If this is the first workflow step, then, for the configuration in FIG. 2*a*, file 310 represents initial file 202. If this is the second or later workflow step, then, for the configuration in FIG. 2*a*, file 310 represents resulting processed file 202'. For the configuration depicted in FIG. 2*b*, if this is the first workflow then step file 310 represents file 203, otherwise file 310 represents resulting processed file 203'.

Next, in step 312, a decision is made as to whether an asset agent is installed at the processing mechanism associated with the current workflow step. If there is no asset agent installed, then process 300 returns to step 306. If there is an asset agent installed in the processing mechanism associated with the current workflow step, then process 300 continues to step 314. In step 314, one or more tracking parameters are retrieved from the meta-data associated with the installed asset agent installed in the processing mechanism associated with the current workflow step.

In step 318, tracking information associated with the retrieved parameter(s) is provided. In the configuration of FIG. 2a, the tracking information is included in resulting processed file 202'. For the configuration depicted in FIG. 2b, the tracking information is provided to tacking database 240, for example, as described above.

Although some preferred implementations of the various methods and apparatuses of the present invention have been illustrated in the accompanying drawings and described in the foregoing detailed description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:
retrieving a workflow definition that is associated with a plurality of processing mechanisms, each processing mechanism being a program or device configured to process at least a part of a data file;
associating a plurality of parameters with the plurality of processing mechanisms;
processing at least a portion of a data file according to the retrieved workflow definition using the at least one of the processing mechanisms to produce a resulting processed data file; and
recording information regarding each of the parameters within the resulting processed data file, and wherein the data file includes printable information content and the resulting processed data file includes corresponding processed printable information content and a metadata portion that includes the information regarding the parameters.

2. The method as recited in claim 1, further comprising: selectively retrieving the information regarding at least one of the parameters from the resulting processed data file.

3. The method as recited in claim 1, further comprising: providing information regarding at least one of the parameters to a database.

4. The method as recited in claim 3, further comprising: selectively retrieving the information regarding at least one of the parameters from the database.

5. The method as recited in claim 1, wherein the at least one processing mechanism is selected from a group of processing mechanisms that includes an application program, a driver program, a communication program, a coding program, a decoding program, a data conversion program, a database program, and an operating system program.

6. The method as recited in claim 1, wherein the at least one processing mechanism is selected from a group of processing mechanisms that includes a computer, a server computer, a communication device, a peripheral device, a printing device, a scanning device, an imaging device, and an entertainment device.

7. The method as recited in claim 1, wherein at least one of the parameters is selected from a group of parameters that includes a processing mechanism time parameter, a processing mechanism communication parameter, a processing mechanism identity parameter, a processing mechanism status parameter, a processing mechanism error parameter, and a processing mechanism resource parameter.

8. The method as recited in claim 1, wherein the data file defines a document suitable for printing and wherein the at least one processing mechanism is a printing device that is operatively configured to print the document.

9. An apparatus comprising:
first and second processing logic each configured to process at least a portion of a data file according to a retrieved workflow definition to produce a resulting processed data file, wherein the data file includes printable information content; and
agent logic operatively coupled to one or both of the first and second processing logic and configured to collect and include additional data in the resulting processed data file based on the retrieved workflow definition, the additional data being related to processing parameters associated with the first and second processing logic and the processing of at least the portion of the data file by the first or second processing logic, and wherein the resulting processed data file includes processed printable information content and a metadata portion that includes the additional data.

10. The apparatus as recited in claim 9, wherein the first and second processing logic are provided in at least one program selected from a group of programs comprising an application program, a driver program, a communication program, a coding program, a decoding program, a data conversion program, a database program, and an operating system program.

11. The apparatus as recited in claim 9, wherein the agent logic and one or both of the first and second processing logic are operatively configured within one or more processing mechanisms selected from a group of processing mechanisms that includes a computer, a server computer, a communication device, a peripheral device, a printing device, a scanning device, an imaging device, and an entertainment device.

12. The apparatus as recited in claim 9, wherein at least one of the processing parameters is selected from a group of parameters comprising a time parameter, a communication parameter, an identity parameter, a status parameter, an error parameter, and a resource parameter.

13. The apparatus as recited in claim 9, wherein the data file defines a document suitable for printing and wherein one or both of the first and second processing logic is operatively configured with a printing device that is further arranged to print the document.

14. A system comprising:
a network;
a plurality of processing mechanisms operatively coupled to the network and configured to share a data file over the network, and wherein each processing mechanism is a program or device configured to process at least a portion of the data file in accord with a retrieved workflow definition, and is further configured to include additional data in a resulting processed data file, the additional data including information related to a plurality of processing parameters associated with the plurality of processing mechanisms while processing at least the portion of the data file, and wherein the data file includes printable information content and the resulting processed data file includes corresponding processed printable information content and a metadata portion that includes the additional data.

15. The system as recited in claim 14, further comprising:
a device operatively coupled to the network and configured to receive the resulting processed data file from at least one of the processing mechanisms via the network, and selectively process the additional data therein.

16. The system as recited in claim 14, further comprising:
a device operatively coupled to the network and configured to selectively define the workflow according to the workflow definition.

17. The system as recited in claim 14, further comprising:
a device operatively coupled to the network and configured to selectively communicate the at least one processing parameter associated with the processing mechanism to the processing mechanism via the network.

* * * * *